US010735318B2

(12) United States Patent
Liu

(10) Patent No.: US 10,735,318 B2
(45) Date of Patent: Aug. 4, 2020

(54) METHOD AND APPARATUS FOR MANAGING DATA TRANSMISSION CHANNEL

(71) Applicant: Huawei Technologies Co., Ltd., Shenzhen (CN)

(72) Inventor: Kai Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 15/637,443

(22) Filed: Jun. 29, 2017

(65) Prior Publication Data

US 2017/0302570 A1    Oct. 19, 2017

Related U.S. Application Data

(63) Continuation of application No. PCT/CN2015/096302, filed on Dec. 3, 2015.

(30) Foreign Application Priority Data

Dec. 30, 2014 (CN) .......................... 2014 1 0842925

(51) Int. Cl.
*H04L 12/723* (2013.01)
*H04L 12/24* (2006.01)
(Continued)

(52) U.S. Cl.
CPC .......... *H04L 45/50* (2013.01); *H04L 41/0663* (2013.01); *H04L 41/085* (2013.01);
(Continued)

(58) Field of Classification Search
None
See application file for complete search history.

(56) References Cited

U.S. PATENT DOCUMENTS 4,442,518 A * 4/1984 Morimoto ................. H04L 1/22
370/228
6,763,479 B1 * 7/2004 Hebert ................ G06F 11/2005
714/4.11
(Continued)

FOREIGN PATENT DOCUMENTS

CN    101094240 A    12/2007
CN    101155432 A     4/2008
(Continued)

OTHER PUBLICATIONS

Foreign Communication From a Counterpart Application, European Application No. 15875047.1, Extended European Search Report dated Nov. 22, 2017, 10 pages.
(Continued)

*Primary Examiner* — Andrew C Oh
(74) *Attorney, Agent, or Firm* — Conley Rose, P.C.

(57) ABSTRACT

A method and an apparatus for managing a data transmission channel includes obtaining a delay of data transmitted on a first channel and a continuity parameter of the first channel, and a delay of data transmitted on a second channel and a continuity parameter of the second channel; detecting whether a fault event occurs on the first channel; and switching a working channel of a source provider edge (PE) and a sink PE to the second channel when the fault event occurs on the first channel.

18 Claims, 7 Drawing Sheets

(51) Int. Cl.
    *H04L 12/26*     (2006.01)
    *H04W 16/18*     (2009.01)

(52) U.S. Cl.
    CPC ...... *H04L 41/0806* (2013.01); *H04L 41/0896* (2013.01); *H04L 41/5022* (2013.01); *H04L 41/5025* (2013.01); *H04L 43/087* (2013.01); *H04L 43/0847* (2013.01); *H04L 43/10* (2013.01); *H04L 43/16* (2013.01); *H04W 16/18* (2013.01)

(56) References Cited

U.S. PATENT DOCUMENTS

| | | | |
|---|---|---|---|
| 7,903,544 B2 * | 3/2011 | Shivnan | H04B 10/1149 370/218 |
| 9,094,499 B2 * | 7/2015 | Dunne | H04L 65/80 |
| 2007/0253326 A1 * | 11/2007 | Saha | H04L 12/4641 370/217 |
| 2008/0095047 A1 | 4/2008 | Skalecki et al. | |
| 2008/0151881 A1 * | 6/2008 | Liu | H04L 1/0002 370/389 |
| 2009/0147690 A1 * | 6/2009 | King | H04L 45/22 370/245 |
| 2009/0201809 A1 * | 8/2009 | Sommerville | H04L 45/00 370/232 |
| 2009/0257345 A1 * | 10/2009 | King | H04L 41/22 370/216 |
| 2009/0316580 A1 * | 12/2009 | Pang | G06F 15/7842 370/235 |
| 2010/0299443 A1 * | 11/2010 | Hu | H04N 7/165 709/231 |
| 2011/0141911 A1 | 6/2011 | Washam et al. | |
| 2011/0317638 A1 * | 12/2011 | Cho | H04W 72/0413 370/329 |
| 2012/0051227 A1 | 3/2012 | Grandi et al. | |
| 2012/0076509 A1 * | 3/2012 | Gurovich | H04B 10/116 398/212 |
| 2013/0091408 A1 | 4/2013 | O'Connell et al. | |
| 2013/0286823 A1 * | 10/2013 | Taylor | H04L 41/0663 370/228 |
| 2013/0347062 A1 * | 12/2013 | Matityahu | H04L 43/12 726/1 |
| 2014/0025736 A1 * | 1/2014 | Wang | H04L 45/46 709/204 |
| 2016/0142284 A1 * | 5/2016 | Ma | H04L 12/18 370/225 |

FOREIGN PATENT DOCUMENTS

| | | |
|---|---|---|
| CN | 101227397 A | 7/2008 |
| CN | 101247288 A | 8/2008 |
| CN | 101877676 A | 11/2010 |
| CN | 101919207 A | 12/2010 |
| CN | 102025437 A | 4/2011 |
| CN | 102142948 A | 8/2011 |
| CN | 102407868 A | 4/2012 |
| CN | 102843257 A | 12/2012 |
| CN | 102843338 A | 12/2012 |
| CN | 104579770 A | 4/2015 |
| EP | 2254276 A1 | 11/2010 |
| EP | 2533474 A1 | 12/2012 |
| JP | 2010213078 A | 9/2010 |
| JP | 2011188046 A | 9/2011 |
| JP | 2012527808 A | 11/2012 |
| JP | 2013514005 A | 4/2013 |
| JP | 2014158187 A | 8/2014 |
| KR | 101425291 B1 | 7/2014 |
| WO | 2009056972 A1 | 5/2009 |
| WO | 2011003459 A1 | 1/2011 |

OTHER PUBLICATIONS

Machine Translation and Abstract of Chinese Publication No. CN101094240, Dec. 26, 2007, 16 pages.

Foreign Communication From a Counterpart Application, Chinese Application No. 201410842925.0, Chinese Office Action dated Aug. 28, 2018, 9 pages.
Machine Translation and Abstract of Chinese Publication No. CN101155432, Apr. 2, 2008, 22 pages.
Machine Translation and Abstract of Chinese Publication No. CN101227397, Jul. 23, 2008, 8 pages.
Machine Translation and Abstract of Chinese Publication No. CN101247288, Aug. 20, 2008, 9 pages.
Machine Translation and Abstract of Chinese Publication No. CN101877676, Nov. 3, 2010, 7 pages.
Machine Translation and Abstract of Chinese Publication No. CN102025437, Apr. 20, 2011, 10 pages.
Machine Translation and Abstract of Chinese Publication No. CN102407868, Apr. 11, 2012, 7 pages.
Machine Translation and Abstract of Chinese Publication No. CN102843257, Dec. 26, 2012, 14 pages.
Machine Translation and Abstract of Chinese Publication No. CN102843338, Dec. 26, 2012, 8 pages.
Machine Translation and Abstract of Chinese Publication No. CN104579770, Apr. 29, 2015, 17 pages.
Weingarten, Y., Ed., et al., "MPLS Transport Profile (MPLS-TP) Linear Protection," RFC 6378, Oct. 2011, 45 pages.
"IEEE Standard for a Precision Clock Synchronization Protocol for Networked Measurement and Control Systems, IEEE Instrumentation and Measurement Society," IEEE Std 1588, Jul. 24, 2008, 289 pages.
"ITU-T Y.1731 Performance Monitoring in a Service Provider Network," Mar. 30, 2011, 10 pages.
"Series G: Transmission Systems and Media, Digital Systems and Networks, Packet over Transport aspects—MPLS over Transport aspects, Series Y: Global Information Infrastructure, Internet Protocol Aspects and Next-Generation Networks, Internet protocol aspects—Transport, Operations, Administration and Maintenance Mechanism for MPLS-TP in Packet Transport Networks, Amendment 1," ITU-T, G.8113.1/Y.1372.1, Amendment 1, Aug. 2013, 16 pages.
"Series G: Transmission Systems and Media, Digital Systems and Networks, Packet over Transport Aspects—MPLS over Transport aspects, Series Y: Global Information Infrastructure, Internet Protocol Aspects and Next-Generation Networks, Internet Protocol Aspects—Transport, Characteristics of MPLS-TP Equipment Functional Blocks," ITU-T, G.8121/Y.1381, Nov. 2013, 148 pages.
"Series G: Transmission Systems and Media, Digital Systems and Networks, Packet over Transport Aspects—MPLS over Transport aspects, Series Y: Global Information Infrastructure, Internet Protocol Aspects and Next-Generation Networks, Internet Protocol Aspects—Transport, Linear Protection Switching for MPLS Transport Profile," ITU-T, G.8131/Y.1382, Jul. 2014, 34 pages.
"Series Y: Global Information Infrastructure, Internet Protocol Aspects and Next-Generation Networks, Internet Protocol Aspects—Operation, administration and maintenance, OAM functions and mechanisms for Ethernet based networks," ITU-T, Y.1731, May 2006, 80 pages.
"Series Y: Global Information Infrastructure, Internet Protocol Aspects and Next-Generation Networks, Internet Protocol Aspects—Operation, administration and maintenance, OAM functions and mechanisms for Ethernet based networks," ITU-T, Y.1731, Feb. 2008, 82 pages.
Foreign Communication From a Counterpart Application, Chinese Application No. 201410842925.0, Chinese Office Action dated Jul. 25, 2017, 7 pages.
Foreign Communication From a Counterpart Application, PCT Application No. PCT/CN2015/096302, English Translation of International Search Report dated Mar. 1, 2016, 2 pages.
Foreign Communication From a Counterpart Application, PCT Application No. PCT/CN2015/096302, English Translation of Written Opinion dated Mar. 1, 2016, 7 pages.
Machine Translation and Abstract of Japanese Publication No. JP2010213078, Sep. 24, 2010, 14 pages.
Machine Translation and Abstract of Japanese Publication No. JP2011188046, Sep. 22, 2011, 28 pages.

(56) References Cited

OTHER PUBLICATIONS

Machine Translation and Abstract of Japanese Publication No. JP2014158187, Aug. 28, 2014, 31 pages.
Machine Translation and Abstract of Korean Publication No. KR101425291, Jul. 31, 2014, 21 pages.
Foreign Communication From a Counterpart Application, Japanese Application No. 2017-534984, Japanese Office Action dated Aug. 20, 2018, 3 pages.
Foreign Communication From a Counterpart Application, Japanese Application No. 2017-534984, English Translation of Japanese Office Action dated Aug. 20, 2018, 4 pages.
Rekhter, Y., et al., "Use of Provider Edge to Provider Edge (PE-PE) Generic Routing Encapsulation (GRE) or IP in BGP/MPLS IP Virtual Private Networks," RFC 4797, Jan. 2007, 10 pages.
Frost, D., Ed., et al., "Packet Loss and Delay Measurement for MPLS Networks," draft-ietf-mpls-loss-delay-00, Dec. 23, 2010, 40 pages.
Defintion, "Provider Edge," Wikipedia, https://en.wikipedia.org/wiki/Provider_Edge, Nov. 18, 2013, 3 pages.

* cited by examiner

METHOD AND APPARATUS FOR MANAGING DATA TRANSMISSION CHANNEL

CROSS-REFERENCE TO RELATED APPLICATIONS

This application is a continuation application of International Patent Application No. PCT/CN2015/096302, filed on Dec. 3, 2015, which claims priority to Chinese Patent Application No. 20141084-2925.0, filed on Dec. 30, 2014. The disclosures of the aforementioned applications are hereby incorporated herein by reference in their entireties.

TECHNICAL FIELD

The disclosure relates to the field of communications technologies, and in particular, to a method and an apparatus for managing a data transmission channel.

BACKGROUND

Currently, with development of communications technologies, many data transmission networks use a multi-protocol label switching transport profile (MPLS-TP) technology.

One of the main functions of the MPLS-TP technology is keeping an unobstructed data transmission channel for carrying a network service. A channel protection switching mechanism in the MPLS-TP technology is basically that during data exchange between a source provider edge (PE) router and a sink PE router (generally, a source PE router is referred to as a source PE for short, and a sink PE router is referred to as a sink PE for short), two transmission channels, that is, a working channel and a protection channel, are often provided between the source PE and the sink PE. In a default state, the working channel is preferentially used for data exchange between the source PE and the sink PE. The source PE and the sink PE periodically send continuity check messages (CCMs) to each other, so as to determine whether a consecutive packet loss or a bit error occurs on the working channel. If a consecutive packet loss or a bit error occurs on the working channel, a channel used by the source PE and the sink PE is switched from the working channel to the protection channel.

However, in multiple complex service scenarios, factors affecting a network service are not limited to a consecutive packet loss or a bit error, and many other factors, for example, a transmission delay, cause a working channel to fail to be switched in time. However, according to current reception of a CCM, it is difficult to determine whether a relatively great delay exists in data transmission. Therefore, when multiple factors affect a network service, in a current channel protection switching mechanism, it is difficult to trigger in time switching of a working channel, and a channel with a relatively low transmission capability is still used to carry the network service, thereby reducing quality of the network service in a complex service scenario.

SUMMARY

Embodiments of the disclosure provide a method and an apparatus for managing a data transmission channel, so as to improve quality of a network service in a complex service scenario.

To achieve the foregoing objective, the following technical solutions are used in embodiments of the disclosure.

According to a first aspect, an embodiment of the disclosure provides a method for managing a data transmission channel, where the method is used in a transmission network, the transmission network includes at least a source PE and a sink PE, the source PE is connected to the sink PE separately by using a first channel and a second channel, a current working channel of the source PE and the sink PE is the first channel, the working channel is a channel used by the source PE and the sink PE to transmit service data, a current non-working channel that is kept connected between the source PE with the sink PE is the second channel, and the method includes obtaining a delay of data transmitted on the first channel and a continuity parameter of the first channel, where the continuity parameter indicates a quantity of CCMs that are lost consecutively; detecting whether a fault event occurs on the first channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold; and if the fault event occurs on the first channel, switching the working channel of the source PE and the sink PE to the second channel.

With reference to the first aspect, in a first possible implementation manner of the first aspect, data of at least a first service and a second service is transmitted on the first channel, and a priority of the first service is greater than that of the second service, where a priority of a service is negatively correlated to tolerance of the service for a delay.

The fault event that occurs on the first channel includes at least one of the following: a delay of data of the first service is greater than a delay threshold corresponding to the first service, a jitter value of the data of the first service is greater than a jitter value threshold corresponding to the first service, the continuity parameter of the first channel is greater than the preset threshold, or a bit error rate of the first channel is greater than the preset bit error rate threshold.

With reference to the first aspect or the first possible implementation manner of the first aspect, in a second possible implementation manner of the first aspect, before switching the working channel of the source PE and the sink PE to the second channel, the method further includes detecting whether a fault event occurs on the second channel; and switching the working channel of the source PE and the sink PE to the second channel includes, if the fault event occurs on the second channel and a preset condition is met, switching the working channel of the source PE and the sink PE to the second channel, where the preset condition includes the continuity parameter of the first channel is greater than the threshold, and the fault event that occurs on the second channel includes at least one of the following: a delay of data transmitted on the second channel is greater than a preset delay threshold, a jitter value of the data transmitted on the second channel is greater than a preset jitter value threshold, or a bit error rate of the second channel is greater than the preset bit error rate threshold.

With reference to the first aspect or the first possible implementation manner of the first aspect, in a third possible implementation manner of the first aspect, after detecting whether a fault event occurs on the first channel, the method further includes, if the fault event occurs on the first channel, detecting whether a quantity of times that the fault event occurs on the first channel within a designated time exceeds a preset value; and switching the working channel of the source PE and the sink PE to the second channel includes, if the quantity of times that the fault event occurs on the first channel exceeds the preset value, switching the working channel of the source PE and the sink PE to the second channel.

According to a second aspect, an embodiment of the disclosure provides an apparatus for managing a data transmission channel, where the apparatus is used in a transmission network, the transmission network includes at least a source PE and a sink PE, the source PE is connected to the sink PE separately by using a first channel and a second channel, a current working channel of the source PE and the sink PE is the first channel, the working channel is a channel used by the source PE and the sink PE to transmit service data, a current non-working channel that is kept connected between the source PE with the sink PE is the second channel, and the apparatus includes an obtaining module configured to obtain a delay of data transmitted on the first channel and a continuity parameter of the first channel, where the continuity parameter indicates a quantity of CCMs that are lost consecutively; a detection module configured to detect whether a fault event occurs on the first channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold; and a processing module configured to, if the fault event occurs on the first channel, switch the working channel of the source PE and the sink PE to the second channel.

With reference to the second aspect, in a first possible implementation manner of the second aspect, data of at least a first service and a second service is transmitted on the first channel, and a priority of the first service is greater than that of the second service, where a priority of a service is negatively correlated to tolerance of the service for a delay; and the fault event that occurs on the first channel specifically includes at least one of the following: a delay of data of the first service is greater than a delay threshold corresponding to the first service, a jitter value of the data of the first service is greater than a jitter value threshold corresponding to the first service, the continuity parameter of the first channel is greater than the preset threshold, or a bit error rate of the first channel is greater than the preset bit error rate threshold.

With reference to the second aspect or the first possible implementation manner of the second aspect, in a second possible implementation manner of the second aspect, the detection module is further configured to, before switching the working channel of the source PE and the sink PE to the second channel, detect whether a fault event occurs on the second channel; and when switching the working channel of the source PE and the sink PE to the second channel, the processing module is configured to, if the fault event occurs on the second channel and a preset condition is met, switch the working channel of the source PE and the sink PE to the second channel, where the preset condition includes that the continuity parameter of the first channel is greater than the threshold, and the fault event that occurs on the second channel includes at least one of the following: a delay of data transmitted on the second channel is greater than a preset delay threshold, a jitter value of the data transmitted on the second channel is greater than a preset jitter value threshold, or a bit error rate of the second channel is greater than the preset bit error rate threshold.

With reference to the second aspect or the first possible implementation manner of the second aspect, in a third possible implementation manner of the second aspect, the processing module is further configured to, after detecting whether a fault event occurs on the first channel, if the fault event occurs on the first channel, detect whether a quantity of times that the fault event occurs on the first channel within a designated time exceeds a preset value; and when switching the working channel of the source PE and the sink PE to the second channel, the processing module is configured to, if the quantity of times that the fault event occurs on the first channel exceeds the preset value, switch the working channel of the source PE and the sink PE to the second channel.

For the method and the apparatus for managing a data transmission channel provided in the embodiments of the disclosure, the method includes obtaining a delay of data transmitted on a first channel and a continuity parameter of the first channel, and detecting whether a fault event occurs on the first channel, and if the fault event occurs, switching a working channel of a source PE and a sink PE to a second channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with the prior art, in this embodiment of the disclosure, during a process of determining whether a fault event occurs, one or more of a consecutive packet loss, a delay, or a bit error rate in a channel are used as references, so that when multiple factors affect a network service, a channel protection switching mechanism may trigger in time switching of a working channel, and a channel with a high transmission capability can be used in time to carry the network service, thereby improving quality of the network service in a complex service scenario.

BRIEF DESCRIPTION OF DRAWINGS

To describe the technical solutions in the embodiments of the disclosure more clearly, the following briefly describes the accompanying drawings required for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following clearly describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the disclosure.

The disclosure is applicable to a transmission network, and the transmission network includes at least a source PE and a sink PE. The source PE is connected to the sink PE separately by using at least two channels, that is, a first channel and a second channel. A current working channel of the source PE and the sink PE is the first channel, the working channel is a channel used by the source PE and the sink PE to transmit service data, and a current non-working channel that is kept connected between the source PE with the sink PE is the second channel.

Figure 1:
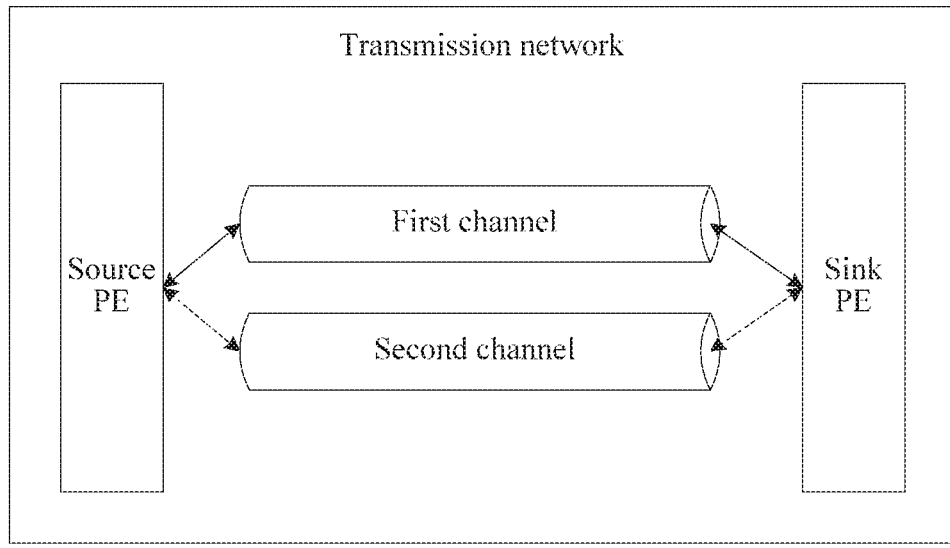
FIG. 1 is a schematic diagram of a specific application scenario of a method for managing a data transmission channel according to an embodiment of the disclosure.

For example, as shown in FIG. 1, the transmission network includes the source PE and the sink PE. The source PE is connected to the sink PE separately by using the first channel and the second channel. The first channel is a current working channel of the source PE and the sink PE, and the second channel is a current non-working channel, that is, a protection channel, that is kept connected between the source PE with the sink PE.

Figure 2:
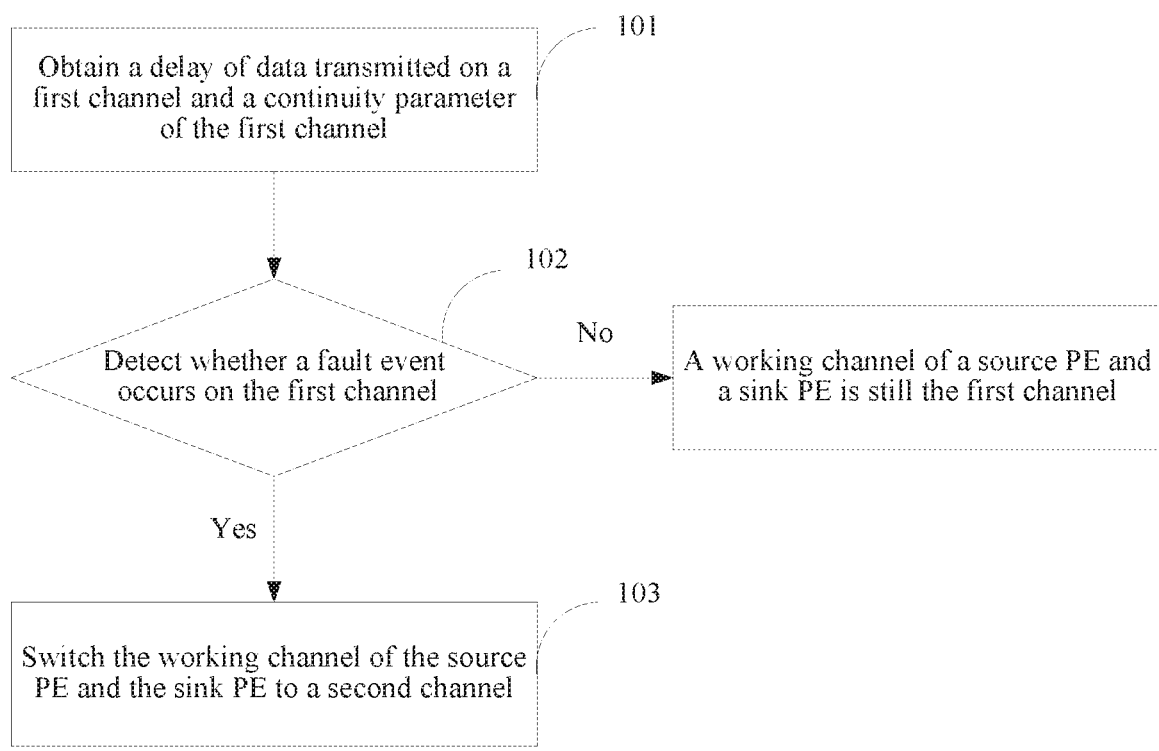
FIG. 2 is a flowchart of a method for managing a data transmission channel according to an embodiment of the disclosure.

An embodiment of the disclosure provides a method for managing a data transmission channel. As shown in FIG. 2, the method includes the following blocks.

Block 101: Obtain a delay of data transmitted on a first channel and a continuity parameter of the first channel.

The continuity parameter indicates a quantity of CCMs that are lost consecutively.

It should be noted that the delay of the data transmitted on the first channel and the continuity parameter of the first channel may be obtained by a source PE or a sink PE.

In this embodiment of the disclosure, an example in which the sink PE is an execution body is used.

By means of two-way delay measurement, on any channel, the sink PE receives a delay measurement message (DMM) sent by the source PE. A timestamp t1 is marked when the source PE sends the DMM, and the timestamp t1 indicates a moment at which the source PE sends the DMM. A timestamp t2 is marked when the sink PE receives the DMM, and the timestamp t2 indicates a moment at which the sink PE receives the DMM. A delay of receiving, by the sink PE on the channel, the DMM sent by the source PE is calculated according to the timestamp t2 and the timestamp t1. Subsequently, the sink PE sends a delay measurement reply (DMR) message to the source PE. A value of an operation code (OpCode) is changed from the DMM to the DMR, and a field in the DMM is copied to the DMR message. A timestamp t3 is marked when the sink PE sends the DMR message, and the timestamp t3 indicates a moment at which the sink PE sends the DMR message. A timestamp t4 is marked when the source PE receives the DMR message, and the timestamp t4 indicates a moment at which the source PE receives the DMR message. A delay of sending, by the sink PE, the DMR message to the source PE on the channel is calculated according to the timestamp t4 and the timestamp t3.

Alternatively, by means of one-way delay measurement, on the channel, the source PE continuously sends CCMs, and the sink PE determines, according to a period, whether the CCMs are received within three periods. If the CCMs are not received within three periods, it is considered that a connectivity problem occurs on the channel. For example, the sink PE receives a delay measurement (DM) message sent by the source PE, so as to obtain a delay of sending the DM message on the channel. The sink PE receives the CCMs sent by the source PE, and obtains a continuity parameter of the channel according to the quantity of the CCMs that are lost consecutively. Alternatively, the sink PE sends the CCMs to the source PE, and obtains a continuity parameter of the channel according to the quantity of the CCMs that are lost consecutively.

It should be noted that the continuity parameter of the first channel may also be obtained by using a ratio of the quantity of lost data packets to the quantity of the sent data packets when a consecutive packet loss occurs in a transmission process of transmitted data.

Block 102: Detect whether a fault event occurs on the first channel.

A fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold. It should be noted that the jitter value indicates a difference of a delay of data in at least two adjacent periods.

In this embodiment of the disclosure, according to the delay of the data transmitted on the first channel and the continuity parameter of the first channel that are obtained in block 101, whether a fault event occurs on the first channel is detected. If one of the following, that is, the continuity parameter of the first channel is greater than the preset threshold, the delay of the data transmitted on the first channel is greater than the preset delay threshold, the jitter value of the data transmitted on the first channel is greater than the preset jitter value threshold, or the bit error rate of the first channel is greater than the preset bit error rate threshold, is detected, it is determined that a fault event occurs on the first channel. It should be noted that the threshold, the delay threshold, the jitter value threshold, and the bit error rate threshold are empirical values determined according to types of specific data, and may be obtained from an empirical database for testing and recording delay cases or may be set by a technician in advance.

For example, the sink PE may further calculate a difference according to a preset period by using the delay that is obtained in block 101 and that is of the data transmitted on the first channel in at least two adjacent periods, so as to obtain the jitter value of the data transmitted on the first channel; whether the jitter value of the first channel is greater than the preset jitter value threshold is detected; if the jitter value of the first channel is greater than the preset jitter value threshold, a fault event occurs on the first channel, and if the jitter value of the first channel is not greater than the preset jitter value threshold, a fault event does not occur on the first channel.

Block 103: If the fault event occurs on the first channel, switch the working channel of the source PE and the sink PE to a second channel.

If the fault event does not occur on the first channel, the working channel of the source PE and the sink PE is still the first channel.

In this embodiment of the disclosure, by means of block 102 of detecting whether a fault event occurs on the first channel, if the fault event occurs on the first channel, the current working channel of the source PE and the sink PE shown in FIG. 1 is switched from the first channel to the second channel; and if the fault event does not occur on the first channel, the working channel of the source PE and the sink PE is not switched.

The method for managing a data transmission channel provided in this embodiment of the disclosure includes obtaining a delay of data transmitted on a first channel and a continuity parameter of the first channel, and detecting whether a fault event occurs on the first channel, and if the fault event occurs, switching a working channel of a source PE and a sink PE to a second channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with the prior art, in this embodiment of the disclosure, during a process of determining whether a fault event occurs, one or more of a consecutive packet loss, a delay, or a bit error rate in a channel are used as references, so that when multiple factors affect a network service, a channel protection switching mechanism may trigger in time switching of a working channel, and a channel with a high transmission capability can be used in time to carry the network service, thereby improving quality of the network service in a complex service scenario.

In this embodiment of the disclosure, data of at least two services is transmitted on the first channel, data of at least a first service and a second service is transmitted on the first channel, and a priority of the first service is greater than that of the second service, where a priority of a service is negatively correlated to tolerance of the service for a delay.

When a priority of a service is negatively correlated to tolerance of the service for a delay, a higher priority of a service indicates lower tolerance of the service for a delay, that is, the service has a higher requirement for the delay; and a lower priority of a service indicates higher tolerance of the service for a delay, that is, the service has a lower requirement for the delay. A service with relatively high sensitivity in a delay may be referred to as a service with relatively low tolerance; and a service with relatively low sensitivity in a delay may be referred to as a service with relatively high tolerance.

The fault event that occurs on the first channel specifically includes at least one of the following: a delay of data of the first service is greater than a delay threshold corresponding to the first service, a jitter value of the data of the first service is greater than a jitter value threshold corresponding to the first service, the continuity parameter of the first channel is greater than the preset threshold, or a bit error rate of the first channel is greater than the preset bit error rate threshold. It should be noted that the jitter value threshold and the delay threshold that correspond to the first service may be different from the jitter value threshold and the delay threshold that correspond to the second service.

For example, when two services that are currently performed are a video service and a voice service, a worker sets delay thresholds and jitter value thresholds of the two services and respective priorities of the two services in advance, and the worker may determine a service with a relatively high priority according to tolerance of the two services for a delay. For example, a priority of the video service is higher than that of the voice service, whether a fault event occurs is determined according to a delay and a jitter value of data of the video service on the first channel and the continuity parameter of the first channel and a delay and a jitter value of data transmitted on the second channel and the continuity parameter of the second channel, so as to determine whether to switch the working channel of the source PE and the sink PE to the second channel.

It should be noted that a priority of a service may be obtained from a network according to a specific service type or set by a technician in advance. The at least two services include a service with a relatively high requirement for a delay and are, for example, two services of a video service, a voice service, and another service such as a mail service that has relatively high sensitivity in the delay. A jitter value of data is obtained according a delay of the data, where a delay of a service on the first channel may be obtained by obtaining delays of data transmitted on the first channel and selecting a delay of the service from the delays of the transmitted data, or by determining a service from data transmitted on the first channel and directly obtaining a delay of the service.

The method for managing a data transmission channel provided in this embodiment of the disclosure includes obtaining a delay of data of a first service that is of a relatively high priority and that is transmitted on a first channel and a continuity parameter of the first channel, and detecting whether a fault event occurs on the first channel, and if the fault event occurs, switching a working channel of a source PE and a sink PE to a second channel, where a fault event that occurs on a channel includes at least one of the following: a delay of data of the first service is greater than a delay threshold corresponding to the first service, a jitter value of the data of the first service is greater than a jitter value threshold corresponding to the first service, the continuity parameter of the first channel is greater than the preset threshold, or a bit error rate of the first channel is greater than the preset bit error rate threshold. As compared with other approaches, in this embodiment of the disclosure, in a process of determining whether a fault event occurs, one or more of a consecutive packet loss in a channel, a bit error rate in a channel, or a delay of a service with a relatively high priority in a channel are used as references, so that it is ensured that when multiple factors affect a network service, a channel protection switching mechanism may trigger in time switching of a working channel, and a channel with a high transmission capability can be used in time to carry the network service, thereby improving quality of the network service in a complex service scenario.

Figure 3:
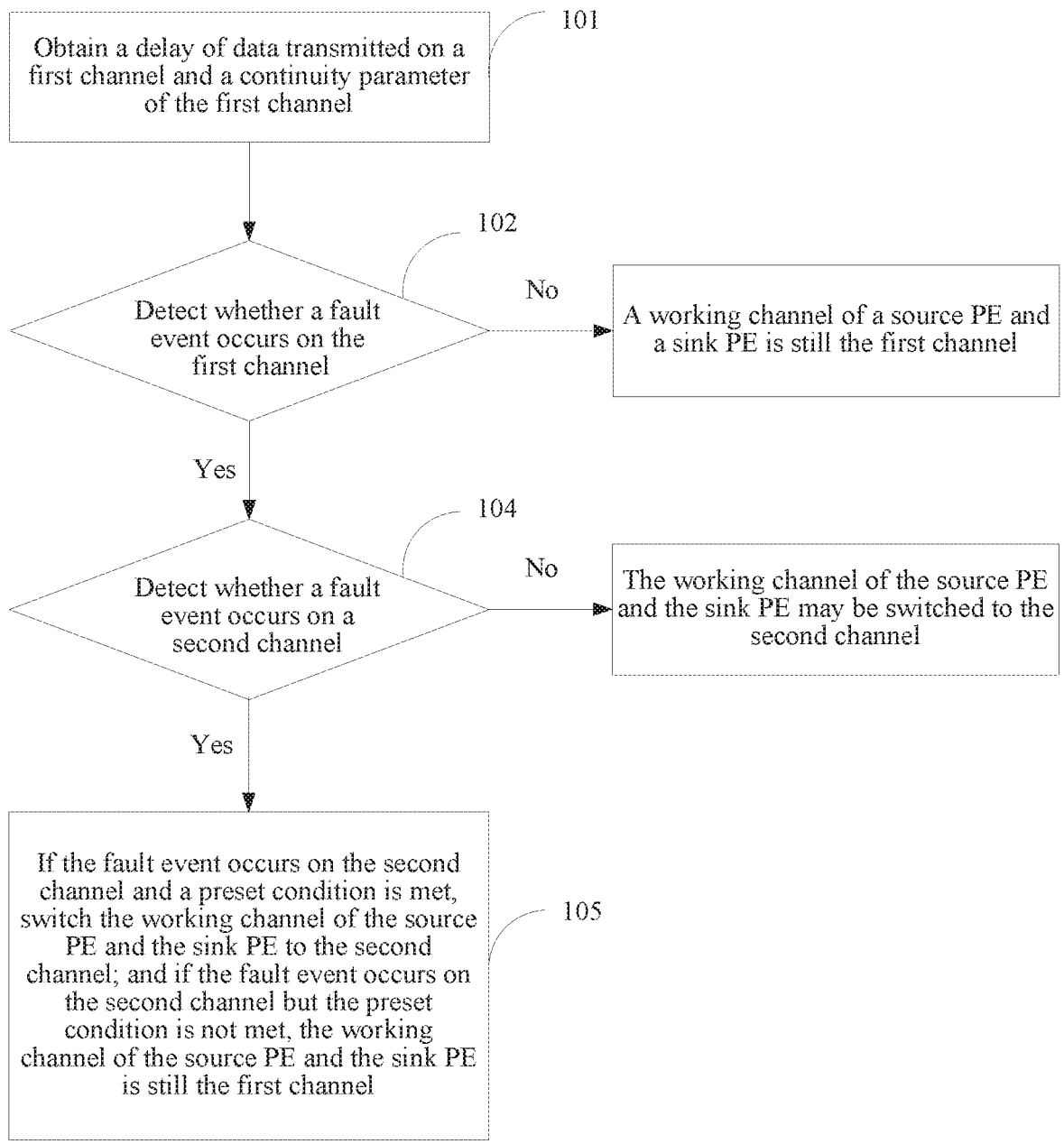
FIG. 3 is a flowchart of another method for managing a data transmission channel according to an embodiment of the disclosure.

In this embodiment of the disclosure, before switching the working channel of the source PE and the sink PE to the second channel, based on the implementation manner shown in FIG. 2, block 103 may also be replaced with block 104 and block 105 to implement an implementation manner shown in FIG. 3.

Block 104: If it is detected that the fault event occurs on the first channel, detect whether a fault event occurs on a second channel.

In this embodiment of the disclosure, according to a delay of data transmitted on the second channel and a continuity parameter of the second channel that are obtained, whether a fault event occurs on the second channel is detected. If one of the following, that is, the continuity parameter of the second channel is greater than the preset threshold, the delay of the data transmitted on the second channel is greater than the preset delay threshold, the jitter value of the data transmitted on the second channel is greater than the preset jitter value threshold, or the bit error rate of the channel is greater than the preset bit error rate threshold, is detected, the fault event occurs on the second channel. It should be noted that when a signal fail or a signal degrade occurs on the second channel, it is considered that the fault event occurs on the second channel. When the continuity parameter of the second channel is greater than the preset threshold, a signal fail occurs on the second channel. When the continuity parameter of the second channel is less than or equal to the preset threshold, and the delay of the data transmitted on the second channel is greater than the delay threshold, the jitter value of the data transmitted on the second channel is greater than the jitter value threshold, or the bit error rate of the data transmitted on the second channel is greater than the bit error rate threshold, a signal degrade occurs on the second channel.

If the fault event does not occur on the second channel, the working channel of the source PE and the sink PE may be switched to the second channel.

Block 105: If the fault event occurs on the second channel and a preset condition is met, switch the working channel of the source PE and the sink PE to the second channel; and if the fault event occurs on the second channel but the preset condition is not met, the working channel of the source PE and the sink PE is still the first channel.

The preset condition includes the continuity parameter of the first channel is greater than the threshold, and the fault event that occurs on the second channel includes at least one of the following: the delay of data transmitted on the second channel is greater than the preset delay threshold, the jitter value of the data transmitted on the second channel is greater than the preset jitter value threshold, or the bit error rate of the second channel is greater than the preset bit error rate threshold.

The method for managing a data transmission channel provided in this embodiment of the disclosure includes obtaining a delay of data transmitted on a first channel and a continuity parameter of the first channel, and a delay of data transmitted on a second channel and a continuity parameter of the second channel, and detecting whether a fault event occurs on the first channel and the second channel, and if the fault event occurs on the first channel, the fault event occurs on the second channel, and a preset condition is met, switching a working channel of a source PE and a sink PE to the second channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with other approaches, in this embodiment of the disclosure, during a process of determining whether a fault event occurs, one or more of a consecutive packet loss, a delay, or a bit error rate in a channel are used as references, so that when multiple factors affect a network service, a channel protection switching mechanism may trigger in time switching of a working channel, and a channel with a high transmission capability can be used in time to carry the network service, thereby improving quality of the network service in a complex service scenario.

Figure 4:
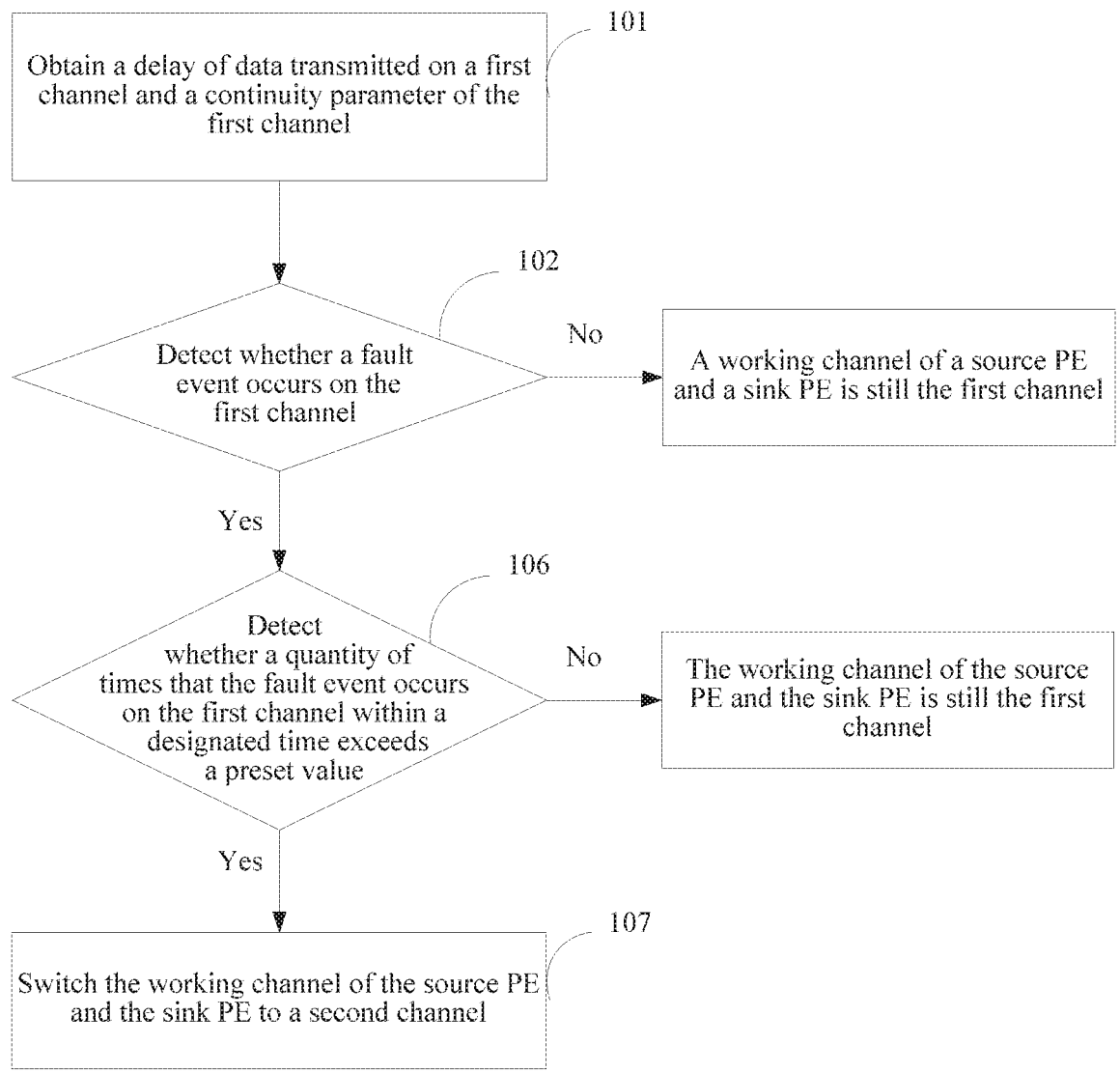
FIG. 4 is a flowchart of another method for managing a data transmission channel according to an embodiment of the disclosure.

In this embodiment of the disclosure, before switching the working channel of the source PE and the sink PE to the second channel, based on the implementation manner shown in FIG. 2, block 103 may also be replaced with block 106 and block 107 to implement an implementation manner shown in FIG. 4.

Block 106: If the fault event occurs on the first channel, detect whether a quantity of times that the fault event occurs on the first channel within a designated time exceeds a preset value.

Block 107: If the quantity of times that the fault event occurs on the first channel exceeds the preset value, switch the working channel of the source PE and the sink PE to a second channel.

If a quantity of times that the fault event occurs does not exceed the preset value, the working channel of the source PE and the sink PE is still the first channel.

In another embodiment of the disclosure, block 107 may be replaced with, if the quantity of times that the fault event occurs on the first channel exceeds the preset value, detecting whether a fault event occurs on the second channel; and if the fault event occurs on the second channel and a preset condition is met, switching the working channel of the source PE and the sink PE to the second channel.

The preset condition includes the continuity parameter of the first channel that is greater than the threshold, and the fault event that occurs on the second channel includes at least one of the following: the delay of data transmitted on the second channel is greater than the preset delay threshold, the jitter value of the data transmitted on the second channel is greater than the preset jitter value threshold, or the bit error rate of the second channel is greater than the preset bit error rate threshold.

Figure 5:
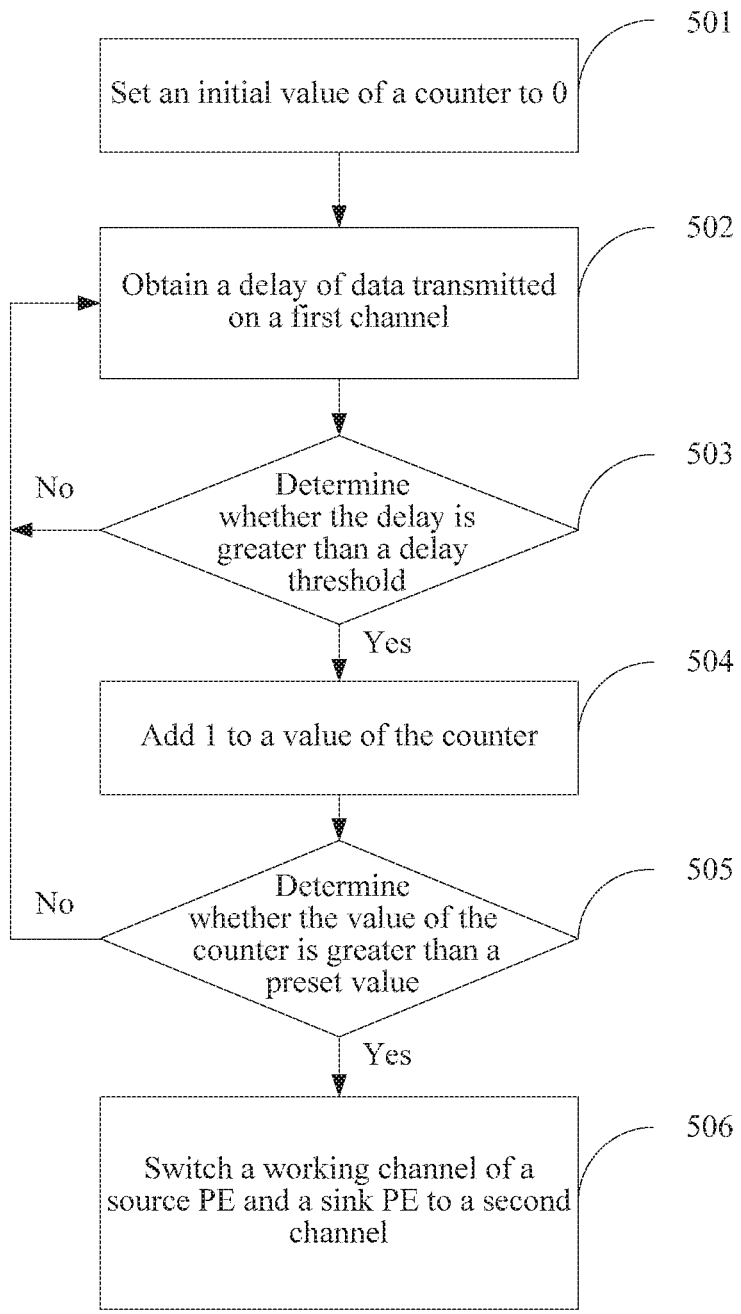
FIG. 5 is a flowchart of specifically determining whether to switch a channel in a method for managing a data transmission channel according to an embodiment of the disclosure.

For example, as shown in FIG. 5, a specific performing process of using the delay of data transmitted on the first channel as a condition for determining whether to switch a channel is as follows.

Block 501: Set an initial value of a counter to 0, where the counter is provided on a sink PE. Block 502: Obtain a delay of data transmitted on the first channel. Block 503: Determine whether the delay is greater than a delay threshold; and if the delay is less than or equal to the delay threshold, continue to perform block 502; or if the delay is greater than the delay threshold, perform block 504. Block 504: Add 1 to a value of the counter. Block 505: Determine whether the value of the counter is greater than a preset value; and if the value of the counter is less than or equal to the preset value, perform block 502; or if the value of the counter is greater than the preset value, perform block 506. Block 506: Switch the working channel of the source PE and the sink PE to the second channel.

Figure 6:
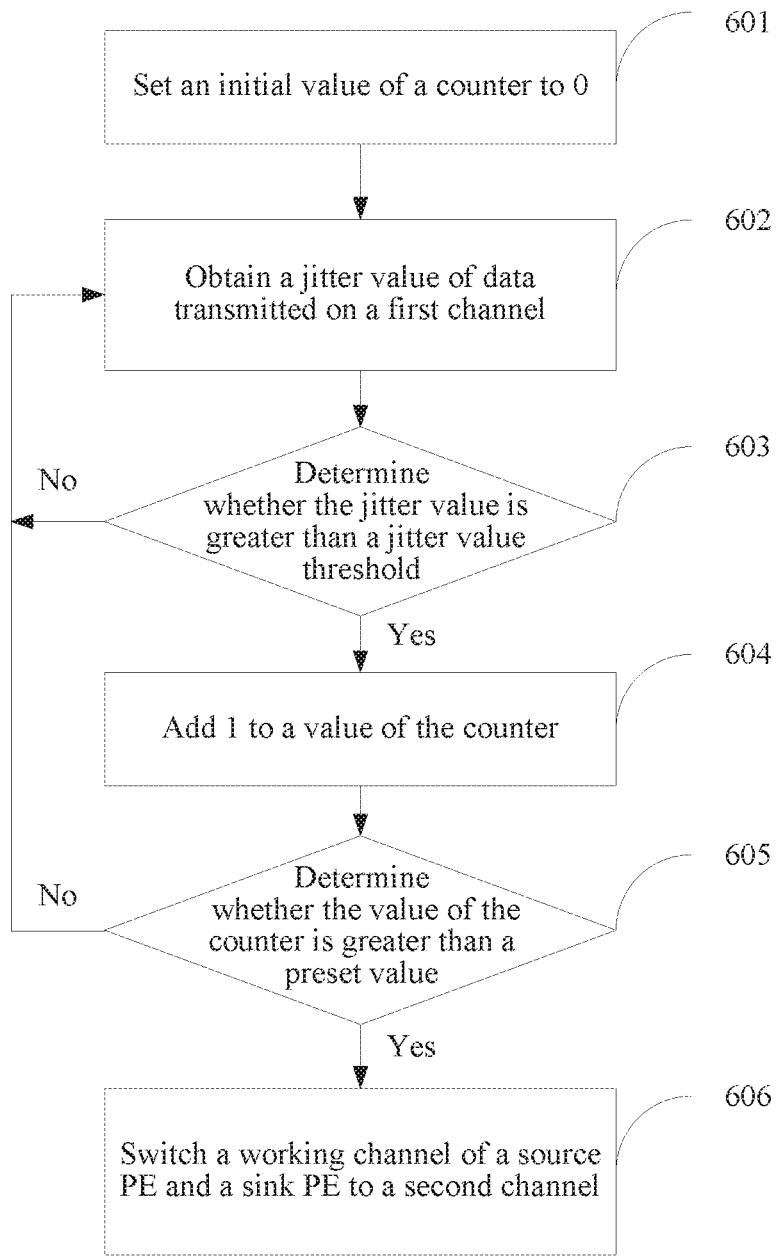
FIG. 6 is a flowchart of specifically determining whether to switch a channel in another method for managing a data transmission channel according to an embodiment of the disclosure.

For example, as shown in FIG. 6, a process of using the jitter value of data transmitted on the first channel as a condition for determining whether to switch a channel is as follows.

Block 601: Set an initial value of a counter to 0, where the counter is provided on a sink PE. Block 602: Obtain a jitter value of data transmitted on the first channel. Block 603: Determine whether the jitter value is greater than a jitter value threshold; if the jitter value is less than or equal to the jitter value threshold, continue to perform block 602; or if the jitter value is greater than the jitter value threshold, perform block 604. Block 604: Add 1 to a value of the counter. Block 605: Determine whether the value of the counter is greater than a preset value; and if the value of the counter is less than or equal to the preset value, perform block 602; or if the value of the counter is greater than the preset value, perform block 606. Block 606: Switch the working channel of the source PE and the sink PE to the second channel.

The method for managing a data transmission channel provided in this embodiment of the disclosure includes obtaining a delay of data transmitted on a first channel and a continuity parameter of the first channel, and a delay of data transmitted on a second channel and a continuity parameter of the second channel, and detecting whether a fault event occurs on the first channel, and if a quantity of times that the fault event occurs within a designated time exceeds a preset value, switching a working channel of a source PE and a sink PE to the second channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with other approaches, in this embodiment of the disclosure, during a process of determining whether a fault event occurs, one or more of a consecutive packet loss, a delay, or a bit error rate in a channel are used as references, so that it is ensured that when multiple factors affect a network service, if a quantity of times that the fault event occurs within a designated time exceeds a preset value, a channel protection switching mechanism may trigger in time switching of a working channel, and a channel with a high transmission capability can be used in time to carry the network service, thereby improving quality of the network service in a complex service scenario.

Figure 7:
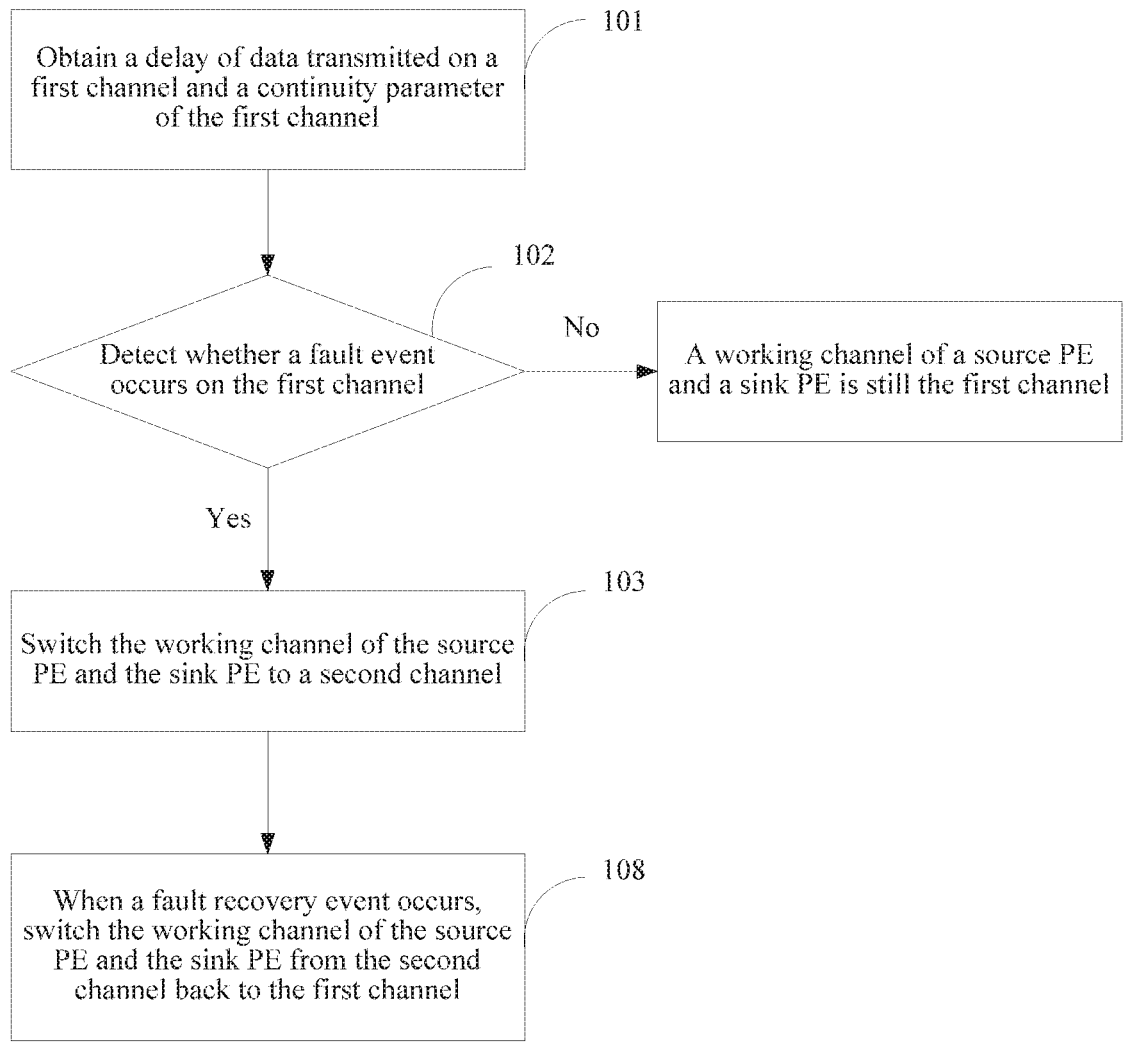
FIG. 7 is a flowchart of another method for managing a data transmission channel according to an embodiment of the disclosure.

In this embodiment of the disclosure, after switching the working channel of the source PE and the sink PE to the second channel, when a fault recovery event occurs, based on any implementation manner shown in FIG. 2 to FIG. 4, block 108 is further included separately after block 103, block 105, and block 107. FIG. 7 is described by using FIG. 2 as an example, and this embodiment of the disclosure further includes an implementation manner shown in FIG. 7.

Block 108: When a fault recovery event occurs, switch the working channel of the source PE and the sink PE from the second channel back to the first channel.

The fault recovery event is that a fault event does not occur on the first channel; or the fault recovery event is that a fault event occurs on the first channel, and a fault event occurs on the second channel, where the fault event that occurs on the second channel is that the continuity parameter of the second channel is greater than the threshold; or the fault recovery event is that a fault event occurs on the first channel, and a fault event occurs on the second channel; moreover, the continuity parameter of the first channel is less than or equal to the threshold, and the continuity parameter of the second channel is less than or equal to the threshold.

After switching the working channel of the source PE and the sink PE from the first channel to the second channel, when a fault recovery event occurs, the working channel of the source PE and the sink PE is switched from the second channel back to the first channel.

For example, as shown in Table 1, the source PE and the sink PE select to perform data transmission on the second channel only when a signal degrade occurs on the first channel and no fault occurs on the second channel, or when a signal fail occurs on the first channel and no fault occurs on the second channel, or when a signal fail occurs on the first channel and a signal degrade occurs on the second channel. When the first channel and the second channel are in other states, the source PE and the sink PE still select to perform data transmission on the first channel.

States at least include a no fault, a signal fail, and a signal degrade (SD). When a continuity parameter of a channel is greater than a preset threshold, a signal fail occurs on the channel. When the continuity parameter of the channel is less than or equal to the preset threshold, and a delay of data transmitted on the channel is greater than a delay threshold, a jitter value of the data transmitted on the channel is greater than a jitter value threshold, or a bit error rate of the data transmitted on the channel is greater than a bit error rate threshold, an SD occurs on the channel. When neither a signal fail nor a signal degrade occurs on the channel, no fault occurs on the channel.

TABLE 1

| Sequence number | First channel | Second channel | Channel selection |
| --- | --- | --- | --- |
| 1 | No fault | No fault | First channel |
| 2 | Signal degrade | No fault | Second channel |
| 3 | Signal fail | No fault | Second channel |
| 4 | No fault | Signal degrade | First channel |
| 5 | Signal degrade | Signal degrade | First channel |
| 6 | Signal fail | Signal degrade | Second channel |
| 7 | No fault | Signal fail | First channel |
| 8 | Signal degrade | Signal fail | First channel |
| 9 | Signal fail | Signal fail | First channel |

As shown in Table 1, when the sequence number column is any state of 1, 4, 5, 7, 8, and 9, if the working channel is the second channel, the working channel needs to be switched back to the first channel; when the sequence number column is any state of 2, 3, and 6, if the working channel is the first channel, the working channel needs to be switched to the second channel.

The method for managing a data transmission channel provided in this embodiment of the disclosure includes obtaining a delay of data transmitted on a first channel and a continuity parameter of the first channel, and a delay of data transmitted on a second channel and a continuity parameter of the second channel, and detecting whether a fault event occurs on the first channel, if the fault event occurs, switching a working channel of a source PE and a sink PE to the second channel, and when a fault recovery event occurs, switching the working channel of the source PE and the sink PE back to the first channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with other approaches, in this embodiment of the disclosure, during a process of determining whether a fault event occurs, one or more of a consecutive packet loss, a delay, or a bit error rate in a channel are used as references, so that it is ensured that when multiple factors affect a network service, a channel protection switching mechanism may trigger in time switching of a working channel, and a channel with a high transmission capability can be used in time to carry the network service, thereby improving quality of the network service in a complex service scenario. Moreover, when a fault recovery event occurs, the working channel of the source PE and the sink PE is switched back to the first channel.

Figure 8:
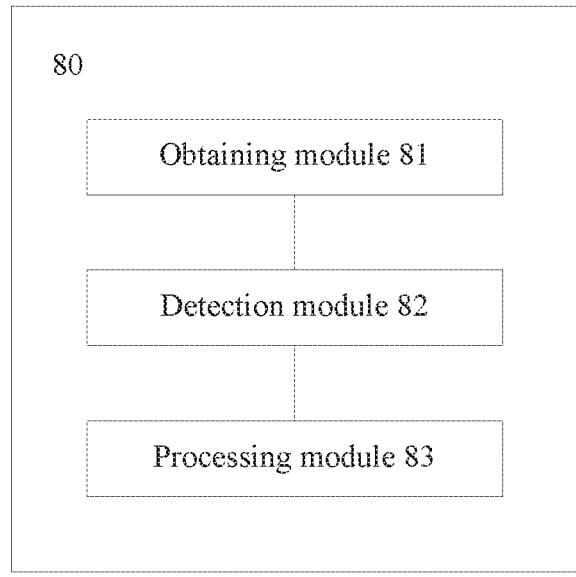
FIG. 8 is a schematic structural diagram of an apparatus for managing a data transmission channel according to an embodiment of the disclosure.

An embodiment of the disclosure further provides an apparatus 80 for managing a data transmission channel. As shown in FIG. 8, the apparatus 80 is used in a transmission network, where the transmission network includes at least a source PE and a sink PE, the source PE is connected to the sink PE separately by using a first channel and a second channel, a current working channel of the source PE and the sink PE is the first channel, and the working channel is a channel used by the source PE and the sink PE to transmit service data; and a current non-working channel that is kept connected between the source PE with the sink PE is the second channel. Parameters, for example, a continuity parameter of a channel in the transmission network, a delay of data transmitted on the channel, a jitter value of the data transmitted on the channel, and a bit error rate of the channel, for determining whether to perform channel switching, are mainly obtained by the sink PE after the sink PE receives data sent by the source PE. After determining that a channel needs to be switched, a specific switching mode may be an existing mode of switching a channel between the source PE and the sink PE. Obtaining parameters for determining whether to perform channel switching and performing a determining process are completed on the sink PE. Therefore, apparatus 80 provided in this embodiment is often provided on the sink PE, and performs the method provided in the foregoing embodiment of the disclosure. The apparatus 80 includes an obtaining module 81 configured to obtain a delay of data transmitted on the first channel and a continuity parameter of the first channel, where the continuity parameter indicates a quantity of data packets that are lost consecutively; a detection module 82 configured to detect whether a fault event occurs on the first channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold; and a processing module 83 configured to, if the fault event occurs on the first channel, switch the working channel of the source PE and the sink PE to the second channel.

In this embodiment of the disclosure, data of at least the first service and the second service is transmitted on the first channel, and a priority of the first service is greater than that of the second service, where a priority of a service is negatively correlated to tolerance of the service for a delay.

The fault event that occurs on the first channel includes at least one of the following: a delay of data of the first service is greater than a delay threshold corresponding to the first service, a jitter value of the data of the first service is greater than a jitter value threshold corresponding to the first service, the continuity parameter of the first channel is greater than the threshold, or a bit error rate of the first channel is greater than the preset bit error rate threshold.

In this embodiment of the disclosure, the detection module 82 is further configured to, before switching the working channel of the source PE and the sink PE to the second channel, detect whether a fault event occurs on the second channel.

The processing module 83 is configured to, if the fault event occurs on the second channel and a preset condition is met, switch the working channel of the source PE and the sink PE to the second channel, where the preset condition includes the continuity parameter of the first channel is greater than the threshold, and the fault event that occurs on the second channel includes at least one of the following: a delay of data transmitted on the second channel is greater than a preset delay threshold, a jitter value of the data transmitted on the second channel is greater than a preset jitter value threshold, or a bit error rate of the second channel is greater than the preset bit error rate threshold.

In this embodiment of the disclosure, the processing module 83 is further configured to, after the detecting whether a fault event occurs on the first channel, if the fault event occurs on the first channel, detect whether a quantity of times that the fault event occurs on the first channel within a designated time exceeds a preset value; and if the quantity of times that the fault event occurs on the first channel exceeds the preset value, switch the working channel of the source PE and the sink PE to the second channel.

The apparatus for managing a data transmission channel provided in this embodiment of the disclosure obtains a delay of data transmitted on a first channel and a continuity parameter of the first channel, and detects whether a fault event occurs on the first channel, and if the fault event occurs, switches a working channel of a source PE and a sink PE to a second channel, where a fault event that occurs on a channel includes at least one of the following: a continuity parameter of the channel is greater than a threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with other approaches, in this embodiment of the disclosure, during a process of determining whether a fault event occurs, one or more of a consecutive packet loss, a delay, or a bit error rate in a channel are used as references, so that when multiple factors affect a network service, a channel protection switching mechanism may trigger in time switching of a working channel, and a channel with a high transmission capability can be used in time to carry the network service, thereby improving quality of the network service in a complex service scenario.

Figure 9:
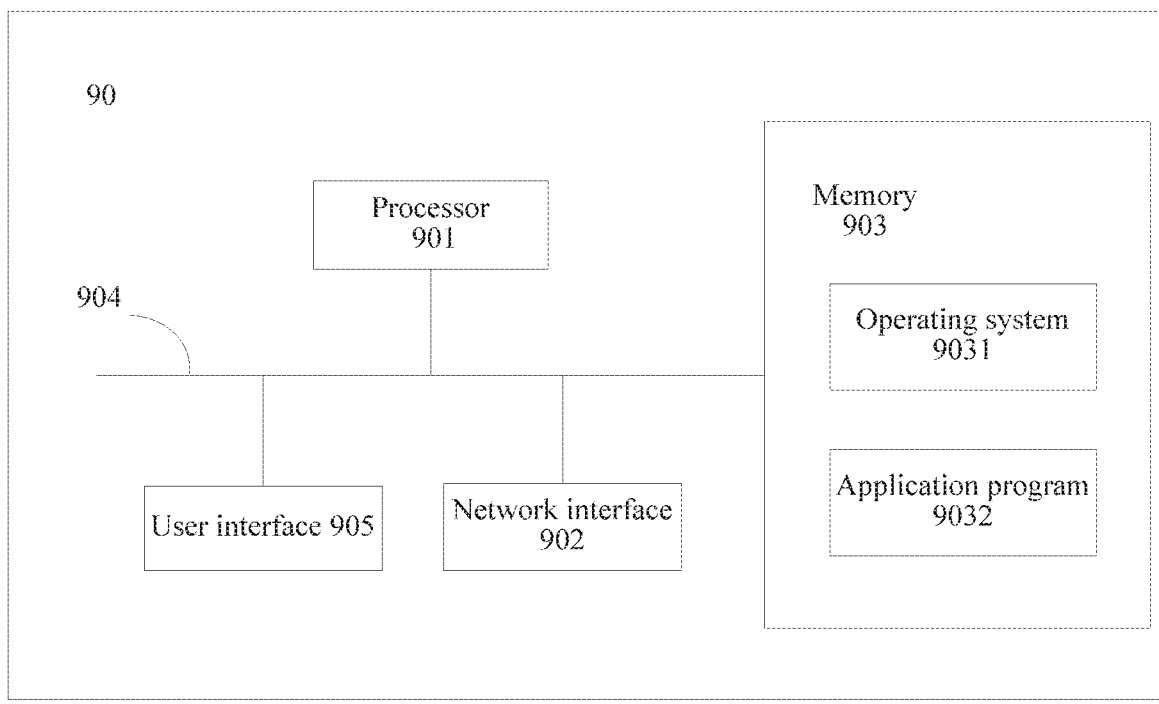
FIG. 9 is a schematic structural diagram of a device for managing a data transmission channel according to an embodiment of the disclosure.

An embodiment of the disclosure provides a device 90 for managing a data transmission channel. As shown in FIG. 9, the device 90 includes at least a processor 901, a network interface 902, a memory 903, and a communications bus 904. The communications bus 904 is configured to implement connection and communication among the processor 901, the network interface 902, and the memory 903. The memory 903 is configured to store data involved in an operation process of the device 90. Optionally, the device 90 further includes a user interface 905, which includes a display, a keyboard, or a click device (such as a mouse, a trackball touch panel, or a touch display screen). The memory 903 may include a high-speed random access memory (RAM), and may also further include a non-volatile memory, for example, at least one magnetic disk storage. Optionally, the memory 903 may include at least one storage apparatus located remotely from the foregoing processor 901. The device 90 is used in a transmission network, where the transmission network includes at least a source PE and a sink PE, the source PE is connected to the sink PE separately by using a first channel and a second channel, a current working channel of the source PE and the sink PE is the first channel, the working channel is a channel used by the source PE and the sink PE to transmit service data, and a current non-working channel that is kept connected between the source PE with the sink PE is the second channel. Parameters, for example, a continuity parameter of a channel in the transmission network, a delay of data transmitted on the channel, a jitter value of the data transmitted on the channel, and a bit error rate of the channel, for determining whether to perform channel switching are obtained by the sink PE after the sink PE receives data sent by the source PE. After determining that a channel needs to be switched, a switching mode may be an existing mode of switching a channel between the source PE and the sink PE. Obtaining parameters for determining whether to perform channel switching and performing a determining process are completed on the sink PE. The sink PE in this embodiment may be implemented as the device 90.

In some implementation manners, the memory 903 stores the following elements, an executable module or a data structure, or a subset thereof, or an extension set thereof: an operating system 9031, including various system programs for implementing various basic services and processing hardware-based tasks; and an application program 9032, including various application programs for implementing various application services.

In this embodiment of the disclosure, the network interface 902 is configured to obtain a delay of data transmitted on the first channel and a continuity parameter of the first channel, where the continuity parameter indicates a quantity of CCMs that are lost consecutively.

The processor 901 is configured to detect whether a fault event occurs on the first channel, where a fault event that occurs on a channel includes at least one of the following: a continuity parameter of the channel is greater than a preset threshold, a delay of data transmitted on the channel is greater than a preset delay threshold, a jitter value of the data transmitted on the channel is greater than a preset jitter value threshold, or a bit error rate of the channel is greater than a preset bit error rate threshold; and if the fault event occurs on the first channel, switch the working channel of the source PE and the sink PE to the second channel.

In this embodiment of the disclosure, data of at least the first service and the second service is transmitted on the first channel, and a priority of the first service is greater than that of the second service, where a priority of a service is negatively correlated to tolerance of the service for a delay.

The fault event that occurs on the first channel includes at least one of the following: a delay of data of the first service is greater than a delay threshold corresponding to the first service, a jitter value of the data of the first service is greater than a jitter value threshold corresponding to the first service, the continuity parameter of the first channel is greater than the threshold, or a bit error rate of the first channel is greater than the preset bit error rate threshold.

In this embodiment of the disclosure, before switching the working channel of the source PE and the sink PE to the second channel, the processor 901 is further configured to detect whether a fault event occurs on the second channel.

The processor 901 is configured to, if the fault event occurs on the second channel and a preset condition is met, switch the working channel of the source PE and the sink PE to the second channel, where the preset condition includes that the continuity parameter of the first channel is greater than the threshold, and the fault event that occurs on the second channel includes at least one of the following: the delay of data transmitted on the second channel is greater than the preset delay threshold, the jitter value of the data transmitted on the second channel is greater than the preset jitter value threshold, or the bit error rate of the second channel is greater than the preset bit error rate threshold.

In this embodiment of the disclosure, after detecting whether a fault event occurs on the first channel, the processor 901 is further configured to, if the fault event occurs on the first channel, detect whether a quantity of times that the fault event occurs on the first channel within a designated time exceeds a preset value; and the processor 901 is further configured to, if the quantity of times that the fault event occurs on the first channel exceeds the preset value, switch the working channel of the source PE and the sink PE to the second channel.

The device for managing a data transmission channel provided in this embodiment of the disclosure obtains a delay of data transmitted on a first channel and a continuity parameter of the first channel, and detects whether a fault event occurs on the first channel, and if the fault event occurs, switches a working channel of a source PE and a sink PE to a second channel, where a fault event that occurs on a channel includes at least one of the following: a continuity parameter of the channel is greater than a threshold, a delay of data transmitted on the channel is greater than a preset delay threshold, a jitter value of the data transmitted on the channel is greater than a preset jitter value threshold, or a bit error rate of the channel is greater than a preset bit error rate threshold. As compared with other approaches, in this embodiment of the disclosure, during a process of determining whether a fault event occurs, one or more of a consecutive packet loss, a delay, or a bit error rate in a channel are used as references, so that when multiple factors affect a network service, a channel protection switching mechanism may trigger in time switching of a working channel, and a channel with a high transmission capability can be used in time to carry the network service, thereby improving quality of the network service in a complex service scenario.

The embodiments in the disclosure are all described in a progressive manner, for same or similar parts in the embodiments, reference may be made to these embodiments, and each embodiment focuses on a difference from other embodiments. A device embodiment is basically similar to a method embodiment, and therefore is described briefly. For related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a RAM.

The foregoing descriptions are merely specific embodiments of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A method for managing data transmission in a network, comprising:
    coupling a source provider edge (PE) to a sink PE using a first channel, wherein the first channel is a current working channel configured to exchange data between the source PE and the sink PE;
    coupling the source PE to the sink PE using a second channel, wherein the second channel is a current non-working channel configured to exchange the data between the source PE and the sink PE when a first fault event occurs in the current working channel;
    obtaining a first delay of data transmitted on the first channel and a continuity parameter of the data transmitted on the first channel based on a consecutive packet loss of the data transmitted on the first channel, wherein the continuity parameter indicates a quantity of continuity check messages that are lost consecutively;
    detecting a first fault state of the first channel by detecting whether the first fault event has occurred on the first channel based on at least one of the first delay, a jitter value of the data transmitted on the first channel, or a bit error rate of the data transmitted on the first channel, wherein the consecutive packet loss, the first delay, and the bit error rate are used as references to detect whether the first fault event occurs, and wherein the first fault state is selected from no fault, signal degrade, and signal fail;
    detecting a second fault state of the second channel by detecting whether a second fault event occurs on the second channel, wherein the second fault state is selected from no fault, signal degrade, and signal fail; and
    switching the current working channel to the second channel based on the first fault state of the first channel and the second fault state of the second channel, wherein the current working channel is switched to the second channel when the second fault event occurs on the second channel and a preset condition is met, wherein the preset condition comprises that the continuity parameter is greater than a preset threshold, and wherein the second fault event comprises at least one of:
        a second delay of data transmitted on the second channel is greater than a preset delay threshold;
        a second jitter value of data transmitted on the second channel is greater than a preset jitter value threshold; or
        a second bit error rate of the second channel is greater than a preset bit error rate threshold.

2. The method for managing data transmission in the network of claim 1, wherein the data comprises a first service data having a first priority and a second service data having a second priority, wherein the first priority is greater than the second priority, wherein the first priority is negatively correlated to a first tolerance of the first service data for the first delay, wherein the second priority is negatively correlated to a second tolerance of the second service data for a second delay on the second channel, and wherein the first fault event on the first channel comprises at least one of:
    a first service data delay is greater than a delay threshold corresponding to the first service data;
    a first service data jitter value is greater than a jitter value threshold corresponding to the first service data;
    the continuity parameter is greater than the preset threshold; or
    the bit error rate is greater than the preset bit error rate threshold.

3. The method for managing data transmission in the network of claim 2, wherein the current working channel is switched to the second channel when the second fault event does not occur, wherein the first channel and the second channel are both multiprotocol label switching (MPLS) channels, and wherein the continuity parameter is obtained using a ratio of a quantity of lost data packets to a quantity of sent data packets.

4. The method for managing data transmission in the network of claim 2, wherein the current working channel is switched to the second channel when the first fault event occurs on the first channel and a quantity of times that the first fault event occurs on the first channel within a designated time exceeds a preset value.

5. The method for managing data transmission in the network of claim 1, wherein the current working channel is switched to the second channel when the first fault event occurs on the first channel and a quantity of times that the first fault event occurs on the first channel within a designated time exceeds a preset value.

6. A device for managing data transmission in a network, comprising:
    an interface configured to:
        obtain a first delay for a first channel between a first provider edge (PE) and a second PE;
        obtain a second delay for a second channel between the first PE and the second PE; and
        obtain a first continuity parameter for the first channel based on a first consecutive packet loss of data transmitted on the first channel, wherein the first continuity parameter indicates a quantity of first continuity check messages that are lost consecutively on the first channel;
        obtain a second continuity parameter for the second channel based on a second consecutive packet loss of other data transmitted on the second channel, wherein the second continuity parameter indicates a quantity of second continuity check messages that are lost consecutively on the second channel; and
    a processor coupled to the interface and configured to:
        detect a first fault state of the first channel when a first fault event occurs on the first channel, wherein the first fault state is signal degrade, wherein the first fault event comprises at least one of: the first delay is greater than a preset delay threshold, a jitter value of the data transmitted on the first channel is greater than a preset jitter value threshold, or a bit error rate of the first channel is greater than a preset bit error rate threshold, and wherein the first consecutive packet loss, the first delay, and the bit error rate are used as references to detect whether the first fault event occurs;
        detect a second fault state of the second channel based on the second continuity parameter, wherein the second fault state is selected from no fault, signal degrade, and signal fail; and
        switch the data transmitted on the first channel to the second channel based on the first fault state and the second fault state, wherein a current working channel is switched to the second channel when a second fault event occurs on the second channel and a preset condition is met, wherein the preset condition comprises that the first continuity parameter is greater than a preset threshold, and wherein the second fault event comprises at least one of:

a second delay of data transmitted on the second channel is greater than the preset delay threshold;

a second jitter value of data transmitted on the second channel is greater than the preset jitter value threshold; or a second bit error rate of the second channel is greater than the preset bit error rate threshold.

7. The device for managing data transmission in the network of claim 6, wherein the data comprises a first service data having a first priority and a second service data having a second priority, wherein the first priority is greater than the second priority, wherein the first priority is negatively correlated to a first tolerance of the first service data for the first delay, wherein the second priority is negatively correlated to a second tolerance of the second service data for the second delay, and wherein the first fault event that occurs on the first channel comprises at least one of:

a first service data delay is greater than a delay threshold corresponding to the first service data;

a first service data jitter value is greater than a jitter value threshold corresponding to the first service data;

the first continuity parameter is greater than the preset threshold; or the bit error rate is greater than the preset bit error rate threshold.

8. The device for managing data transmission in the network of claim 7, wherein the data transmitted is switched from the first channel to the second channel when the first fault event occurs on the first channel and a quantity of times that the first fault event occurs on the first channel within a designated time exceeds a preset value, wherein the first channel and the second channel are both multiprotocol label switching (MPLS) channels, and wherein the first continuity parameter is obtained using a ratio of a quantity of lost data packets to a quantity of sent data packets.

9. The device for managing data transmission in the network of claim 6, wherein the data is switched from the first channel to the second channel when the second fault event does not occur.

10. The device for managing data transmission in the network of claim 6, wherein the data transmitted is switched from the first channel to the second channel when the first fault event occurs on the first channel and a quantity of times that the first fault event occurs on the first channel within a designated time exceeds a preset value.

11. The device for managing data transmission in the network of claim 6, wherein the device for managing data transmission is one of a source provider edge (PE) or a sink PE.

12. The device for managing data transmission in the network of claim 6, further comprising a counter coupled to the processor and configured to generate a value of the first delay or the jitter value.

13. The device for managing data transmission in the network of claim 12, wherein the first PE is a source PE in the network, and wherein the second PE is a sink PE in the network.

14. A transmission network, comprising:
a first provider edge (PE); and
a second PE in communication with the first PE, wherein the second PE comprises an interface configured to:
obtain a first delay for a first channel between the first PE and the second PE;
obtain a second delay for a second channel between the first PE and the second PE; and
obtain a first continuity parameter for the first channel based on a first consecutive packet loss of data transmitted on the first channel, wherein the first continuity parameter indicates a quantity of first continuity check messages that are lost consecutively on the first channel;

obtain a second continuity parameter for the second channel based on a second consecutive packet loss of other data transmitted on the second channel, wherein the second continuity parameter indicates a quantity of second continuity check messages that are lost consecutively on the second channel; and a processor coupled to the interface and configured to:
detect a first fault state of the first channel by detecting whether a first fault event occurs on the first channel based on at least one of: the first delay is greater than a preset delay threshold, a jitter value of the data transmitted on the first channel is greater than a preset jitter value threshold, or a bit error rate of the first channel is greater than a preset bit error rate threshold, wherein the first consecutive packet loss, the first delay, and the bit error rate are used as references to detect whether the first fault event occurs, and wherein the first fault state is selected from no fault, signal degrade, and signal fail;

detect a second fault state of the second channel by detecting whether a second fault event occurs on the second channel, wherein the second fault state is selected from no fault, signal degrade, and signal fail; and switch the data from the first channel to the second channel based on a comparison of the first fault state and the second fault state, wherein a current working channel is switched to the second channel when the second fault event occurs on the second channel and a preset condition is met, wherein the preset condition comprises that the first continuity parameter is greater than a preset threshold, and wherein the second fault event comprises at least one of:

a second delay of data transmitted on the second channel is greater than the preset delay threshold;

a second jitter value of data transmitted on the second channel is greater than the preset jitter value threshold; or a second bit error rate of the second channel is greater than the preset bit error rate threshold.

15. A non-transitory computer readable medium including at least computer program code stored therein for managing transmission in a network on a device associated with a computer that when executed on a processor, causes the device to:

obtain a first delay for a first channel between a first provider edge (PE) and a second PE;

obtain a second delay for a second channel between the first PE and the second PE;

obtain a first continuity parameter for the first channel based on a first consecutive packet loss of data transmitted on the first channel, wherein the first continuity parameter indicates a quantity of first continuity check messages that are lost consecutively on the first channel;

obtain a second continuity parameter for the second channel based on a second consecutive packet loss of other data transmitted on the second channel, wherein the second continuity parameter indicates a quantity of second continuity check messages that are lost consecutively on the second channel;

detect a first fault state of the first channel by detecting whether a first fault event occurs on the first channel based on at least one of: the first delay is greater than a preset delay threshold, a jitter value of the data transmitted on the first channel is greater than a preset jitter value threshold, or a bit error rate of the first channel is greater than a preset bit error rate threshold, wherein the first consecutive packet loss, the first delay, and the bit error rate are used as references to detect whether the first fault event occurs, and wherein the first fault state is selected from no fault, signal degrade, and signal fail;

detect a second fault state of the second channel by detecting whether a second fault event occurs on the second channel, wherein the second fault state is selected from no fault, signal degrade, and signal fail; and switch the data from the first channel to the second channel based on the first fault state of the first channel and the second fault state of the second channel, wherein a current working channel is switched to the second channel when the second fault event occurs on the second channel and a preset condition is met, wherein the preset condition comprises that the first continuity parameter is greater than a preset threshold, and wherein the second fault event comprises at least one of:

a second delay of data transmitted on the second channel is greater than the preset delay threshold;

a second jitter value of data transmitted on the second channel is greater than the preset jitter value threshold; or a second bit error rate of the second channel is greater than the preset bit error rate threshold.

16. The non-transitory computer readable medium of claim 15, wherein the data comprises a first service data having a first priority and a second service data having a second priority, wherein the first priority is greater than the second priority, wherein the first priority is negatively correlated to a first tolerance of the first service data for the first delay, wherein the second priority is negatively correlated to a second tolerance of the second service data for the second delay, and wherein the first fault event that occurs on the first channel comprises at least one of:

a first service data delay is greater than a delay threshold corresponding to the first service data;

a first service data jitter value is greater than a jitter value threshold corresponding to the first service data;

the first continuity parameter is greater than the preset threshold; or the bit error rate is greater than the preset bit error rate threshold.

17. The non-transitory computer readable medium of claim 15, wherein the data is switched from the first channel to the second channel when the second fault event does not occur.

18. The non-transitory computer readable medium of claim 15, wherein the data is switched from the first channel to the second channel when the first fault event occurs and a quantity of times that the first fault event occurs within a designated time exceeds a preset value.

* * * * *